(12) United States Patent
Willis, Jr.

(10) Patent No.: US 10,908,819 B2
(45) Date of Patent: Feb. 2, 2021

(54) MEDIA DRIVE SYSTEM WITH BUILT-IN CONTROLLER FOR IMPROVED FUNCTIONALITY

(71) Applicant: Quantum Corporation, San Jose, CA (US)

(72) Inventor: Thomas Carroll Willis, Jr., Westiminster, CO (US)

(73) Assignee: QUANTUM CORPORATION, San Jose, CA (US)

( * ) Notice: Subject to any disclaimer, the term of this patent is extended or adjusted under 35 U.S.C. 154(b) by 26 days.

(21) Appl. No.: 15/496,421

(22) Filed: Apr. 25, 2017

(65) Prior Publication Data

US 2018/0307410 A1 Oct. 25, 2018

(51) Int. Cl.
| | |
|---|---|
| *G06F 3/06* | (2006.01) |
| *G06F 13/40* | (2006.01) |
| *G06F 13/42* | (2006.01) |
| *G06F 11/00* | (2006.01) |
| *G11B 5/008* | (2006.01) |
| *G11B 27/10* | (2006.01) |
| *G11B 27/11* | (2006.01) |
| *G11B 20/12* | (2006.01) |

(52) U.S. Cl.
CPC ............ *G06F 3/061* (2013.01); *G06F 3/0638* (2013.01); *G06F 3/0686* (2013.01); *G06F 11/00* (2013.01); *G06F 13/4068* (2013.01); *G06F 13/4282* (2013.01); *G11B 5/00813* (2013.01); *G11B 20/1201* (2013.01); *G11B 27/107* (2013.01); *G11B 27/11* (2013.01); *G06F 2213/0028* (2013.01); *G06F 2213/0042* (2013.01)

(58) Field of Classification Search
CPC ........ G06F 3/0682; G06F 3/0686; G06F 7/24; G06F 7/36
See application file for complete search history.

(56) References Cited

U.S. PATENT DOCUMENTS

| | | | |
|---|---|---|---|
| 8,756,687 B1 * | 6/2014 | Klein | G06F 21/80 713/194 |
| 2006/0218434 A1 * | 9/2006 | Solhjell | G06F 11/1456 714/6.12 |
| 2017/0293439 A1 * | 10/2017 | Basham | G06F 3/0619 |

* cited by examiner

*Primary Examiner* — Michelle T Bechtold
(74) *Attorney, Agent, or Firm* — Roeder & Broder LLP; James P. Broder (57) ABSTRACT

A media drive system (310) configured for use with a media drive (314) that performs read/write operations relative to a media cartridge (316) includes a system housing (312). The system housing (312) includes a housing body (312A) and a controller (350) that is secured to the housing body (312A). The controller (350) is configured to control functionality of the tape drive (314). More specifically, the inclusion of the controller (350) as part of the system housing (312) enables the media drive system (310) to achieve greatly enhanced functionality. For example, the media drive system (310) can greatly enhance the speed of various desired read/write operations performed within the media drive (314), especially when the requested files or file segments are not necessarily initially provided in sequential order on the media cartridge (316). The controller (350) can include one or both of a processor (352) and a memory system (354).

20 Claims, 5 Drawing Sheets

MEDIA DRIVE SYSTEM WITH BUILT-IN CONTROLLER FOR IMPROVED FUNCTIONALITY

BACKGROUND

Magnetic tape has long been used as a storage media for audio, video and computer information. Magnetic tape cartridges have been used extensively because they provide a convenient way to house and support a length of magnetic tape for engagement by a transducer in a tape drive while protecting the tape upon removal of the cartridge. Moreover, magnetic tape cartridges facilitate economic and compact storage of data. With the advent of widespread use of magnetic tape cartridges, the need to provide systems for storage and retrieval of such tape cartridges has resulted in a wide range of automated systems.

Typically, dozens, hundreds or even thousands of media cartridges, e.g., tape cartridges, are stored within a media library, e.g., a tape library, with each tape cartridge being stored in a particular storage slot in the media library. Responsive to a host computer request, a robotic mechanism, e.g., a robotic storage media retrieval assembly, moves along a rack to physically retrieve an appropriate tape cartridge from its associated storage slot in the media library. The robotic mechanism then moves the tape cartridge to an appropriate device, i.e. a tape drive of a tape drive system, and inserts the tape cartridge into the device so that the requested read/write operations can be performed.

Tape cartridges are also often inserted into the tape drive of a tape drive system, e.g., manually or automatically, for purposes of performing desired read/write operations outside of the realm of a media library. Stated in another fashion, in certain applications, the tape drive system can be used in a more standalone manner.

Figure 1:
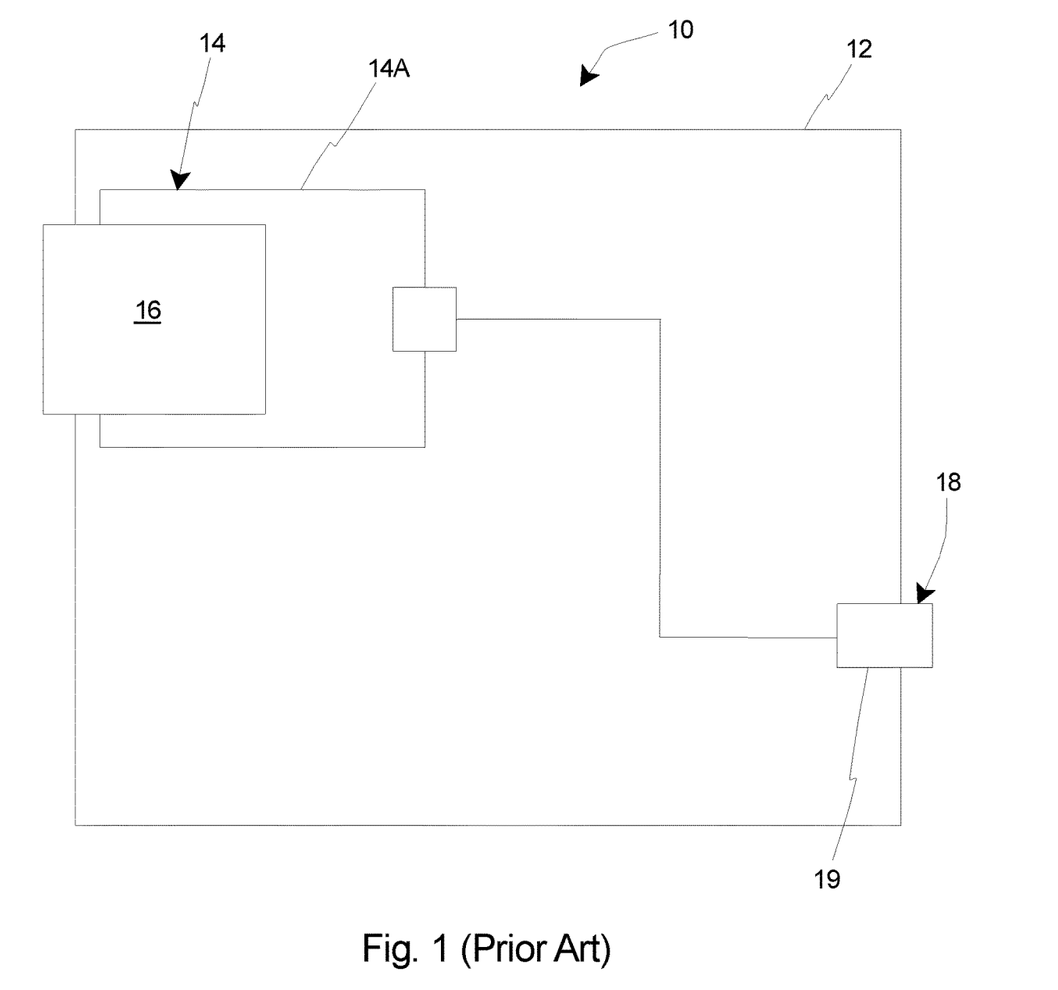
FIG. 1 is a simplified schematic top view illustration of a prior art tape drive system.

Unfortunately, presently available tape drive systems can be somewhat lacking in overall functionality. For example, FIG. 1 is a simplified schematic top view illustration of a prior art tape drive system 10. As shown in FIG. 1, the prior art tape drive system 10 typically includes a system housing 12 (also sometimes referred to in the art as a "drive tray" or a "drive sled"); a tape drive 14 that is positioned substantially within the system housing 12, the tape drive 14 being configured to receive a tape cartridge 16 (also sometimes referred to as "tape media" or "storage media") within a drive housing 14A of the tape drive 14; and an electrical interface 18. The electrical interface 18 can include a host bus adapter 19 ("HBA") that enables a host computer (not shown) to access the tape drive 14, and thus the media library as a whole, for purposes of initiating desired read/write operations. In such prior art tape drive systems 10, the electrical interface 18 and/or the HBA 19 is typically provided in the form of a single serial-attached SCSI ("SAS") or fibre channel ("FC") type electrical connection.

In using such a tape drive system 10, the tape drive 14 can operate in a fast manner (i.e. can perform very fast read operations) when files or file segments are in sequential order on the tape cartridge 16. However, if the files and file segments are not in sequential order on the tape cartridge 16, the ability to access the desired files or file segments for read operations can be very slow. Stated in another manner, random access to the files and file segments on the tape cartridge 16 is undesirably slow. Additionally, tape repositioning and movement over the tape heads to provide the necessary random access can require the tape drives to be cleaned often and the storage media to wear quickly. Moreover, any attempts to reorder the data on the storage media can often require multiple tape drives and an external server with appropriate applications in order to perform such functions. Thus, in such prior art tape drive systems 10, when the files and file segments are not in sequential order on the tape cartridge 16, the user is faced with the probability of very slow access to the data as well as requiring much greater complexity for the full media library.

Additionally, the ability to replicate the data, i.e. files and file segments, on the tape cartridge 16, and the ability to reclaim unused space on the tape cartridge 16 also occurs very slowly and can be very costly.

Thus, it is desired to develop a tape drive system that can overcome these deficiencies as found in the prior art tape drive system 10, while still keeping it backwards compatible.

SUMMARY

The present invention is directed toward a media drive system configured for use with a media drive that performs read/write operations relative to a media cartridge. In various embodiments, the media drive system includes a system housing including a housing body and a controller that is secured to the housing body. Additionally, the controller is configured to control functionality of the media drive. More specifically, the inclusion of the controller as part of the system housing enables the media drive system to achieve greatly enhanced functionality as compared to prior art tape drive systems. For example, the media drive system of the present invention can greatly enhance the speed of various desired read/write operations performed within the media drive, especially when the requested files or file segments are not necessarily initially provided in sequential order on the media cartridge.

In certain embodiments, the controller includes a processor. Additionally, the processor can include an operating system that helps coordinate and organize the functionality of the media drive system for a host/user of the media drive system. Further, in some such embodiments, the processor is configured to perform checksum operations to ensure the integrity and verify the accuracy of data contained within the media cartridge. The ability to quickly detect data integrity problems further enables such problems to be more quickly overcome, e.g., by rewriting the data or files that include the error.

In some embodiments, the controller can additionally and/or alternatively include a memory system. The memory system can have at least one memory card. In certain such embodiments, the controller is configured to (i) copy data from the media cartridge to the at least one memory card of the memory system, (ii) reorder the data on the at least one memory card, and (iii) recopy the reordered data to one of the media cartridge and a second media cartridge.

Additionally, in certain embodiments, the controller can be configured to generate a content search data table of data that is contained on the media cartridge.

Further, the media drive system can further include a plurality of electrical interfaces that are coupled to the housing body. In various embodiments, the plurality of electrical interfaces include at least two of a serial-attached SCSI type electrical connection, a fibre channel type electrical connection, an Ethernet-type electrical connection, and a USB-type electrical connection.

In some embodiments, the media drive system further includes a media drive that is positioned substantially within the housing body. The media drive is configured to selectively receive a media cartridge and to perform read/write operations relative to the media cartridge.

The present invention is further directed toward a media library including (i) a library housing that defines an interior cavity; (ii) a plurality of storage slots that are positioned within the interior cavity, each of the plurality of storage slots being configured to selectively retain a media cartridge; (iii) the media drive system as described above that is positioned within the interior cavity; and (iv) a storage media retrieval assembly that is positioned within the interior cavity, the storage media retrieval assembly being configured to selectively move the media cartridges between the plurality of storage slots and the media drive of the media drive system.

Additionally, in another application, the present invention is further directed toward a method for forming a media drive system that is configured for use with a media drive that performs read/write operations relative to a media cartridge, the method including the step of securing a controller to a housing body of a system housing, the controller being configured to control functionality of the media drive.

Further, in still another application, the present invention is directed toward a media drive system including (A) a media drive that is configured to selectively receive a media cartridge to perform read/write operations relative to the media cartridge; (B) a system housing including a housing body and a controller that is secured to the housing body, the controller being configured to control functionality of the media drive, the controller including a processor and a memory system having at least one media card, and the media drive being positioned substantially within the housing body; and (C) a plurality of electrical interfaces that are coupled to the housing body.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a media drive system, e.g., a tape drive system, that enables greatly improved functionality as compared to prior art tape drive systems. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
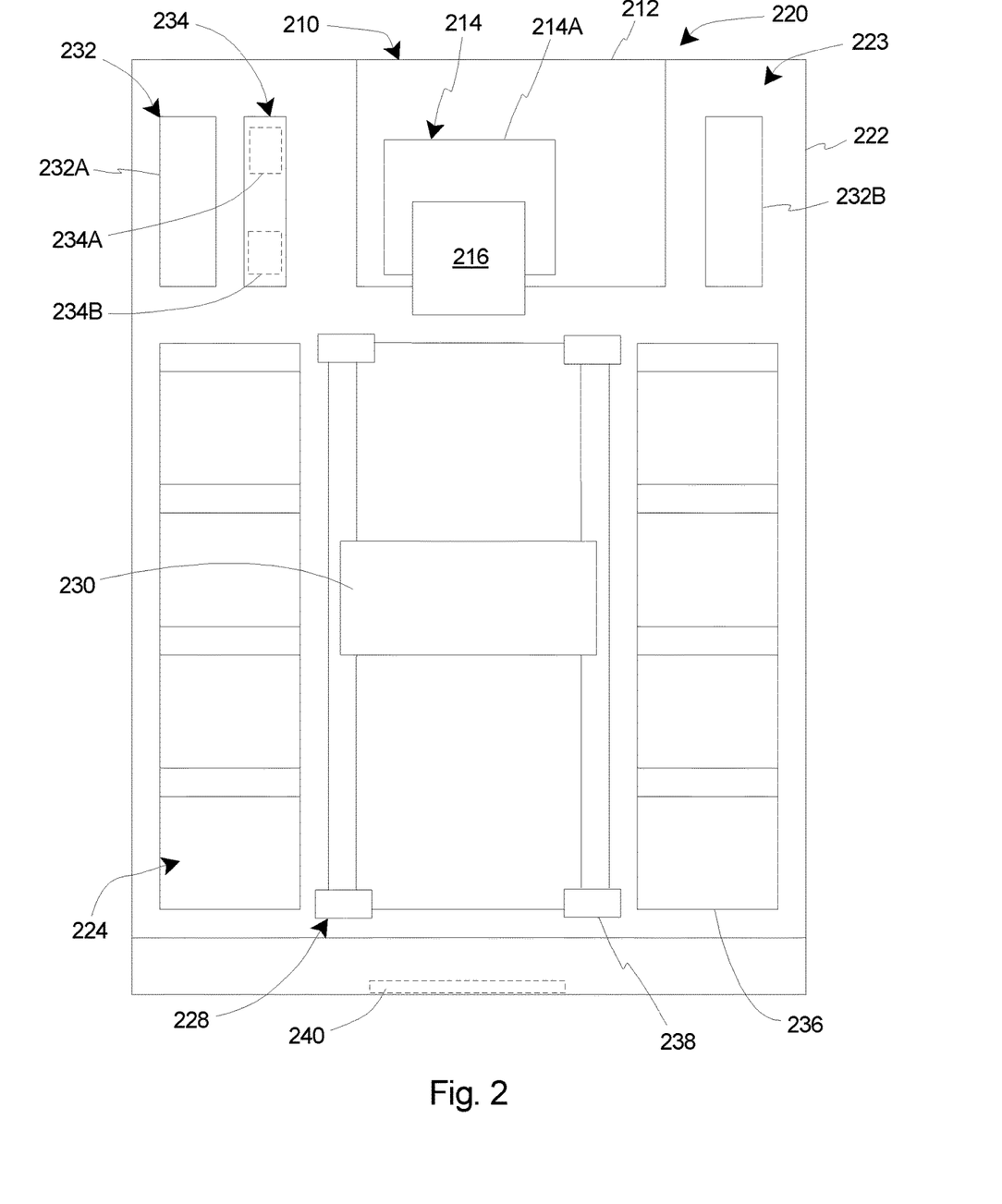
FIG. 2 is a simplified schematic top view illustration of a media library including a media drive system having features of the present invention.

FIG. 2 is a simplified schematic top view illustration of a media library 220, e.g., a tape library, including a media drive system 210, e.g., a tape drive system, having features of the present invention. The design of the media library 220 can be varied as desired. In particular, the media library 220 can have any suitable design that is capable of storing a plurality of storage media. More specifically, it is noted that the media library 220 illustrated in FIG. 2 is just one non-exclusive example of a media library usable with the present invention, and no limitations are intended based on the specific type and/or size of the media library 220 shown in FIG. 2. Additionally, although the media library 220 shown and described relative to FIG. 2 is specifically referred to and/or described at times as a tape cartridge library or tape library, it is understood that the present invention is equally applicable for use with any other suitable types of libraries using other types of storage media, such as optical disks, magnetic disk drives, emulated or virtual tape drives, etc., as non-exclusive examples. However, for ease of discussion, FIG. 2 and certain other Figures herein are sometimes described using tape cartridges as the applicable storage media, although this is not intended to restrict or limit the present invention in this manner.

In various embodiments, as illustrated in FIG. 2, the media library 220 includes (i) a library housing 222 that defines an interior cavity 223; (ii) a plurality of storage slots 224 that are each configured to receive and selectively retain (and store) a storage media cartridge 216, e.g., a tape cartridge (sometimes referred to herein simply as a "media cartridge", "tape media", "storage media" or "media"); (iii) a rack assembly 228; (iv) a storage media retrieval assembly 230 (also referred to herein simply as a "retrieval assembly"); (v) the media drive system 210 including one or more media drives 214, e.g., tape drives; (vi) a power supply 232; and (vii) a control system 234. Additionally, in FIG. 2, the library housing 222 is illustrated without a cover for purposes of clarity.

As an overview, in various embodiments, the tape drive system 210 is configured to provide enhanced functionality in comparison to prior art tape drive systems. More particularly, the tape drive system 210 includes certain additional features and components that greatly enhance the speed of various desired read/write operations, especially when the requested files or file segments are not necessarily initially provided in sequential order on the storage media 216. Additionally, the tape drive system 210 further enables the creation of content searchable data tables of the data and file metadata contained within all of the storage media 216 within the media library 220 (or multiple media libraries 220). These capabilities are largely enabled with the tape drive system 210 of the present invention through the ability to replicate and reorder data segments on the storage media 216 through the provision of a controller 350 (illustrated in FIG. 3), which includes a processor 352 (illustrated in FIG. 3) and/or a memory system 354 (illustrated in FIG. 3), as part of a system housing 212 of the tape drive system 210.

It is appreciated that all of these advantages and enhancements provide the user of the media library 220 including the tape drive system 210 of the present invention with many time-efficiency and cost-efficiency advantages over a user/host who is accessing a media library that includes a more traditional prior art tape drive system. Additionally, it is further appreciated that the enhanced tape drive system 210 of the present invention can be effectively utilized in a more standalone manner, i.e. without having the tape drive system 210 positioned and/or utilized within the environment of a media library.

The library housing 222 is configured to retain various components of the tape library 220. For example, as shown in FIG. 2, the plurality of storage slots 224, the rack assembly 228, the retrieval assembly 230, the one or more tape drives 214 of the tape drive system 210, the power supply 232 and the control system 234 can all be received and retained at least substantially, if not entirely, within the interior cavity 223 that is defined by the library housing 222. Additionally, as illustrated in FIG. 2, the library housing 222 can be rigid and have a substantially rectangular-shaped cross-section. Alternatively, the library housing 222 can have another suitable shape or configuration. For example, the library housing 222 can have a substantially square-shaped or any other suitable shaped cross-section. Further, the library housing 222 may be constructed of any number of conventional materials such as, for example, those utilized in industry standard rack mount cabinets.

In the embodiment shown in FIG. 2, the plurality of storage slots 224 can be positioned within the library housing 222, with the storage slots 224 being configured to receive and retain (and store) the storage media 216. More particularly, in various embodiments, each of the storage slots 224 is configured to receive and retain a single storage media cartridge 216. It is noted that no storage media 216 is shown as being retained within the storage slots 224 in FIG. 2 for purposes of clarity.

In alternative embodiments, the tape library 220 can include any suitable number of storage slots 224, and/or the tape library 220 can be designed to retain any suitable number of storage media cartridges 216. For example, in certain embodiments, the tape library 220 can include forty storage slots 224 arranged in two four-by-five storage areas. More particularly, in this embodiment, the tape library 220 includes two magazines 236, one on each side of the retrieval assembly 230, with each magazine 236 including four columns of storage slots 224, and with each column having five storage slots 224 oriented substantially horizontally one on top of another (with limited spacing therebetween). It is understood that from the simplified top view shown in FIG. 2, the number of storage slots 224 in each column is not readily apparent. Alternatively, the tape library 220 can include greater than forty or fewer than forty storage slots 224 and/or the storage slots 224 can be arranged in a different manner than is illustrated and described in relation to FIG. 2.

Further, the storage media 216 can include a plurality of tape cartridges, or the storage media 216 can alternatively include a plurality of optical disks, magnetic disk drives, emulated tape drives, etc., as non-exclusive examples.

The design and configuration of the rack assembly 228 can be varied to suit the specific requirements of the tape library 220. For example, in one non-exclusive embodiment, the rack assembly 228 can include four individual racks 238 that are spaced apart from one another. Additionally, in some embodiments, each rack 238 can be oriented in a generally vertical direction and can extend a height that is sufficient to enable the retrieval assembly 230 to effectively retrieve storage media 216 from any of the plurality of storage slots 224. Alternatively, the rack assembly 228 can include a different number of racks 238. For example, in some non-exclusive alternative embodiments, the rack assembly 228 can include two racks, three racks or more than four racks that are spaced apart from one another.

The media storage retrieval assembly 230 selectively, e.g., upon request of a user, retrieves and moves the storage media 216 as desired between the storage slots 224 and the tape drives 214. In particular, during use, upon receiving a signal from the control system 234 to access a certain storage media 216, the retrieval assembly 230 can be manipulated to physically retrieve the requested storage media 216 from its associated storage slot 224 in the tape library 220. Subsequently, the retrieval assembly 230 moves the storage media 216 to an appropriate tape drive 214, and inserts the storage media 216 into a drive housing 214A of the tape drive 214 so that the requested read/write operations can be performed. Upon completion of the requested read/write operations, the retrieval assembly 230 can then return the storage media 216 to an appropriate storage slot 224.

As provided herein, in certain embodiments, the retrieval assembly 230 can be relatively lightweight, thereby limiting the overall power requirements for moving and operating the retrieval assembly 230.

Additionally, it is appreciated that although a single retrieval assembly 230 is illustrated in FIG. 2, the tape library 220 can be designed to include more than one such retrieval assembly 230. For example, in one non-exclusive alternative embodiment, the tape library 220 can include two retrieval assemblies to function in different portions of the tape library 220 and/or to provide redundancy in the event that one of the retrieval assemblies fails.

The one or more media drives 214, e.g., tape drives, are configured for reading and/or writing data with respect to the storage media 216. The number of tape drives 214 provided within the tape library 220 can be varied to suit the specific requirements of the tape library 220. For example, in certain embodiments, the tape library 220 can include three tape drives 214 that are stacked substantially one on top of another (with limited spacing therebetween). Alternatively, the tape library 220 can include greater than three or fewer than three tape drives 214 and/or the tape drives 214 can be positioned in a different manner relative to one another. Further, depending on the specific design of the media library 220, the media drives 214 can be adapted for use with different types of media, such as tape cartridges, optical drives, hard disk drives, etc.

Further, in certain embodiments, the tape library 220 can include more than a single tape drive system 210 for purposes of providing the one or more tape drives 214. For example, in some embodiments, the tape library 220 can include a plurality of tape drive systems 210, with each tape drive system 210 including one or more individual tape drives 214. In one such embodiment, the tape library 220 can include three individual tape drive systems 210, with each tape drive system 210 including a single tape drive 214, to provide a total of three tape drives 214 for the tape library 220. Alternatively, the tape library 220 can include any desired number of tape drive systems 210 and/or tape drives 214.

The power supply 232 provides electrical power in a well-known manner to the one or more media drives 214, the retrieval assembly 230, the control system 234 and/or additional media libraries 220. The power supply 232 can be interfaced with these components as well as with an external power source in a well-known manner using industry standard cabling and connections. Alternatively, the power supply 232 can be interfaced with these components in another manner.

In certain embodiments, the power supply 232 can include a primary power source 232A and a secondary power source 232B. The primary power source 232A can be configured to provide all necessary power for the tape library 220 in most situations. Additionally, the secondary power source 232B can be provided as a backup source in situations where the primary power source 232A fails or otherwise becomes unavailable, and/or when the primary power source 232A is unable to provide all the power needed to perform the desired operations within the tape library 220. Alternatively, the power supply 232 can include only a single power source.

The control system 234 provides the desired and necessary control for general functionality of the tape library 220. For example, in certain embodiments, the control system 234 can include a system control board 234A (illustrated simply as a box in phantom) and an assembly control card 234B (illustrated simply as a box in phantom). In some applications, the system control board 234A receives commands from a user for accessing and/or moving certain storage media 216. The system control board 234A can subsequently forward such commands to the assembly control card 234B for purposes of accessing and/or moving the storage media 216 as desired with the retrieval assembly 230. The system control board 234A can further control the tape drives 214 for reading and/or writing data with respect to the storage media 216 as desired. Thus, the control system 234, i.e. the system control board 234A and the assembly control card 234B, provides the basic functional control of the tape drives 214 and the retrieval assembly 230.

The control system 234 can have any suitable design, many of which are well-known in the industry. For example, in one embodiment, the control system 234 can include a standard driver interface unit for receiving digital commands and translating the commands into driving currents, such as step pulses for controlling stepper motors. Further, the control system 234 can include a standard programmable general purpose computer formed on a single plug-in card unit and can include a programmed microprocessor or microcontroller, memory, communication interface, control interface, connectors, etc. Alternatively, the control system 234 can have a different design and/or the control system 234 can be positioned within the tape library 220 in a different position or manner than that illustrated in FIG. 2.

Additionally, the tape library 220 can use well-known industry standard cabling and communication protocols between the control system 234 and other structures of the tape library 220. Cabling and electrical characteristics including signaling protocols can be generally standardized, and the logical message protocols can be either proprietary or standardized as known to those skilled in the art.

Further, as shown, the tape library 220 can also include a display 240 (illustrated in phantom), e.g., a touchscreen display, which provides an interface that enables the user to interact with and/or transmit requests to the tape library 220.

Figure 3:
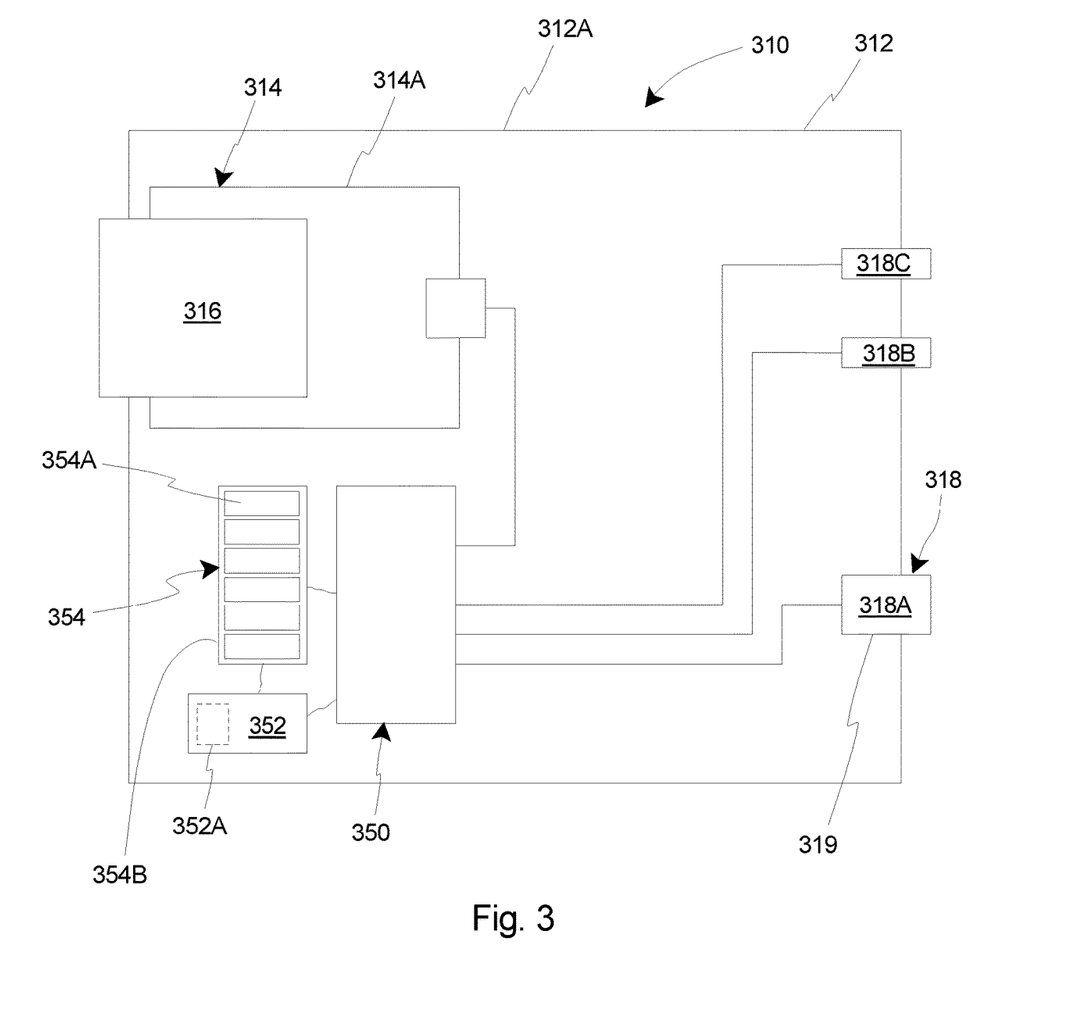
FIG. 3 is a simplified schematic top view illustration of an embodiment of the media drive system.

FIG. 3 is a simplified schematic top view illustration of an embodiment of the media drive system 310, e.g., the tape drive system, having features of the present invention. The design of the tape drive system 310 can be varied to suit the requirements of the tape library 220 (illustrated in FIG. 2) and/or to be effectively operated in a standalone manner. For example, as shown in FIG. 3, the tape drive system 310 can include a system housing 312, a tape drive 314 that is configured to receive a tape cartridge 316 within a drive housing 314A of the tape drive 314, and at least one electrical interface 318. Additionally, as provided herein, the system housing 312 includes a housing body 312A and a controller 350 that is secured to or otherwise coupled to the housing body 312A. As illustrated in the embodiment shown in FIG. 3, the controller 350 is positioned spaced apart from the drive housing 314A of the tape drive 314. Further, as illustrated, in some embodiments, the controller 350 can include a processor 352 and/or a memory system 354 that are configured to enable the desired enhanced functionality of the tape drive system 310. Alternatively, the tape drive system 310 can be configured to include more components or fewer components than those specifically noted herein and illustrated in FIG. 3.

It is appreciated that the controller 350 can be secured to or coupled to the housing body 312A in any suitable manner and in any suitable position. For example, in alternative embodiments, the controller 350 can be secured to or coupled to an inner surface or an outer surface of the housing body 312A.

As provided herein, the tape drive system 310 is configured to provide greatly enhanced functionality in comparison to prior art tape drive systems 10 (as shown in FIG. 1), while still maintaining desired backwards compatibility. For example, the tape drive system 310 can include various features and components as noted above, e.g., the controller 350 that can include one or both of the processor 352 and the memory system 354, which enable the tape drive system 310 to relatively quickly and comprehensively provide random access to the files and file segments on the tape cartridge 316 and/or within the media library 220. Additionally, the ability to replicate the data, i.e. files and file segments, on the tape cartridge 316, and the ability to reclaim unused space on the tape cartridge 316 is also greatly enhanced. Further, the various features and components of the tape drive system 310 further enable the creation of content searchable and/or addressable data tables of data and file metadata that is contained on any and all tape cartridges 316 contained within the media library 220 (or associated media libraries), or that are otherwise accessed or utilized within the tape drive 314, e.g., when the tape drive system 310 is utilized in a standalone manner.

Still further, it is appreciated that the tape drive system 310 can be configured to include different types of personalities that are specifically suited for different functionalities depending on the specific requirements of the media library 220. Thus, it is further appreciated that the specific designs and functional capabilities of the controller 350, the processor 352, and the memory system 354, as described in greater detail herein below, are not meant to be limiting in any manner.

The system housing 312 is configured to retain the various components of the tape drive system 310. Stated in another manner, the system housing 312 includes the housing body 312A which generally houses and/or surrounds the various components within the tape drive system 312. In particular, as shown in this embodiment, the tape drive 314, the at least one electrical interface 318, and the controller 350, i.e.

including the processor 352 and the memory system 354, are all secured to, coupled to and/or positioned and retained substantially within the housing body 312A of the system housing 312.

In certain embodiments, the housing body 312A is substantially rectangular box-shaped. Alternatively, the housing body 312A can have another suitable shape or configuration. For example, the housing body 312A can have a substantially square-shaped or any other suitable shaped cross-section. Further, the housing body 312A may be constructed of any number of conventional materials.

Additionally, in some embodiments, it is desired that the system housing 312 (and the overall tape drive system 310) have approximately the same form factor as the prior art system housing 12 (illustrated in FIG. 1) and tape drive system 10. With such design, the tape drive system 310 can be used and integrated within any current types of media libraries 220 that are designed to use the prior art tape drive systems 10. Further, such design also enables the tape drive system 310 to be used in conjunction with one or more prior art tape drive systems 10 within the media library 220. In some embodiments, the media library 220 may include new partition types that enable the new features and capabilities within the enhanced tape drive system 310.

In certain embodiments, the tape drive system 310 and/or the system housing 312 may further include a cover, e.g., as part of the housing body 312A, but the cover has not been included in FIG. 3 for purposes of clarity.

The tape drive 314 is positioned substantially within the system housing 312. Additionally, the tape drive 314 is configured to receive the tape cartridge 316 (e.g., any tape cartridge that may be retained within the media library 220) substantially within the drive housing 314A. As with any typical tape drive, the tape drive 314 in the tape drive system 310 is configured to perform any and all desired read/write operations and/or any other desired drive operations, e.g., cleaning of the tape drive 314, upon the request of a host/user. Further, it is appreciated that, in most circumstances, the tape cartridge 316 will be positioned within drive housing 314A of the tape drive 314 and/or within the system housing 312 only when it is desired by the host/user to perform read/write operations utilizing the tape cartridge 316. Stated in another manner, the tape cartridge 316 is not positioned within the tape drive 314 and/or within the system housing 312 merely for storage purposes. Thus, it is further understood that the tape cartridge 316 is selectively positioned within the tape drive 314 and/or the system housing 312 only when it is desired by the host/user to perform read/write operations utilizing the tape cartridge 316. Accordingly, the enhanced functionality of the tape drive system 310 that is enabled via the present invention is made possible by the specific inclusion of the controller 350, i.e. the processor 352 and/or the memory system 354, as part of the system housing 312, and is unrelated to any functionality of any components of the tape library 220, e.g., the control system 234 (illustrated in FIG. 2), that are not specifically included and/or positioned within the system housing 312. As such, any components that are specifically noted as being positioned substantially within the system housing 312 should not be confused with any components that may be positioned within the library housing 222 (illustrated in FIG. 2) but not within the system housing 312.

As noted above, the at least one electrical interface 318 can be secured to, coupled to, and/or positioned substantially within the housing body 312A of the system housing 312. The at least one electrical interface 318 enables a host computer (not shown) to access the tape drive 314, and thus the media library 220 as a whole, for purposes of initiating desired read/write operations. In the embodiment illustrated in FIG. 3, the tape drive system 310 includes three separate electrical interfaces 318, i.e. a first electrical interface 318A, a second electrical interface 318B and a third electrical interface 318C. The inclusion of multiple electrical interfaces 318A-318C increases the variability of access (and corresponding functionality) that are possible for different hosts/users of the tape drive system 310 and/or the media library 220.

In one embodiment, the first electrical interface 318A can include a host bus adapter 319 ("HBA"), with the electrical interface 318A and/or the HBA 319 being provided in the form of a serial-attached SCSI ("SAS") or fibre channel ("FC") type electrical connection, i.e. similar to that provided in a typical prior art tape drive system 10.

Additionally, in certain embodiments, the second electrical interface 318B can be provided in the form of an Ethernet-type electrical connection. Further, in some embodiments, the third electrical interface 318C can be provided in the form of a USB-type electrical connection.

In alternative embodiments, the tape drive system 310 can include greater than three or fewer than three electrical interfaces 318, and/or the electrical interfaces 318A-318C can be of different types or have different designs than the specific examples noted herein. For example, it is understood that in such embodiments a small custom motherboard could be designed and made to support whatever type(s) of electrical interfaces that the designer wants. Still alternatively, separate motherboards could be designed for each desired type of electrical interface.

Further, any suitable types of connections or connectors can be utilized between the external electrical interfaces 318A-318C and the controller 350, and between the controller 350 and the tape drive 314 for purposes of providing the desired access to the tape drive 314 for the host/user.

The controller 350 is configured to control the various functions of the tape drive system 310. For example, the controller 350 is configured to control the functionality of the tape drive 314 during performance of any requested read/write operations. Additionally, the controller 350 can be configured to control various other functions that are enabled within the tape drive system 310 due to the specific components of the controller 350, e.g., the processor 352 and the memory system 354, that may be included as part of the system housing 312 within the tape drive system 310.

As shown, in some embodiments, the processor 352 is electrically coupled to, and thus forms a part of the controller 350. Additionally and/or alternatively, the processor 352 can be integrally formed within the controller 350.

In certain embodiments, the processor 352 can include and/or incorporate an operating system 352A (illustrated in phantom) that helps to coordinate and organize the functionality of the tape drive system 310 for the host/user.

In various embodiments, it is desired to control the overall costs of operating the tape drive system 310 and the media library 220 in general. Thus, in such embodiments, it is appreciated that the tape drive system 310 can be configured to utilize off-the-shelf components as much as possible. Moreover, the use of off-the-shelf components makes the new components easier to replace, upgrade and support than if specially designed components are utilized.

For example, in certain applications, the tape drive system 310 can utilize a Compute Stick device from Intel Corporation of Santa Clara, Calif., which includes an Intel Core M processor. Alternatively, the tape drive system 310 can utilize a processor from Advanced RISC Machines of San Jose, Calif. (sometimes referred to as an "ARM processor"). Such ARM processors are designed to perform a smaller number of types of computer instructions so that they can operate at a higher speed, sometimes enabling the performance of millions of instructions per second. Either such devices have a relatively small form factor so as to easily fit within the tape drive system 310 (i.e. without the need to increase the overall size or form factor of the tape drive system 310 as a whole), as well as being able to provide the desired processing capabilities at a relatively low cost. Still alternatively, the tape drive system 310 can use another type of device, e.g., from Intel or another reputable company, which includes any suitable type of processor.

As noted, the processor 352 can be configured to perform any desired number and types of functions to enhance the overall operational capabilities of the tape drive system 310. For example, in certain embodiments, the processor 352 can be configured to perform checksum operations in order to ensure the integrity and verify the accuracy of the data contained within the tape cartridges 316. Moreover, in some such embodiments, the processor 352 may be able to detect data integrity problems fast enough that data could be automatically rewritten when SCSI return codes replies that the particular files have an error. Additionally, the processor 352 can be configured to perform many other desired functions.

The memory system 354 is also electrically coupled to, and thus forms a part of the controller 350. Additionally, the memory system 354 may also be electrically coupled to the processor 352. As illustrated, in various embodiments, the memory system 354 can include a plurality of memory cards 354A that are coupled together within a memory housing 354B. Alternatively, the memory system 354 can include only a single memory card 354A and/or can have another suitable design.

In some embodiments, the memory system 354 can include a RAID0 and/or a RAID6 array of fast microSD cards 354A. The new type of microSD cards 354A can be as fast as solid state drives (SSDs) for performing read operations. While the write operations may typically be only half as fast, putting them in a RAID0 array stripes the data and thus makes the resulting RAID drive much faster.

For example, in one embodiment, the memory system 354 and/or the tape drive system 310 can utilize Universal Flash Storage ("UFS") cards from Samsung Electronics of Suwon, South Korea that have a read speed that is comparable to SSDs. In certain applications, these external storage cards may be able to read more than five times faster than normal microSD cards.

Alternatively, the memory system 354 can use a different type of memory cards 354A.

During certain operations of the tape drive system 310, the memory system 354 can be utilized under control of the controller 350 to create the ability to copy all data from the chosen tape cartridges 316, i.e. from the desired storage media, to the memory cards 354A that are contained within the tape drive system 310. The file or data segments can then be re-ordered within the memory system 354 so that they are in sequential order (or in another desired order). The files and data can then be copied back into the same tape cartridges 316 and/or into different tape cartridges 316. Importantly, the reordering of the file segments and data can be performed wholly within the tape drive system 310 itself without the need for additional tape drives or external servers. The file segments and data being thus re-ordered, enables much faster access to the desired data during any read operations, as compared to prior art tape drive systems 10. Additionally, this process further creates a fast way to reclaim space on the tape cartridges 316 that may otherwise be wasted due to changes made within the files and data on the tape cartridges 316.

Such enhanced functionalities make the tape drive 314 look like both a tape drive and an SSD while still using the same at least one electrical interface 318. In particular, by copying all of the data from the tape cartridge 316 to the memory cards 354A, the tape drive system 310 can then be used like an SSD. The tape drive system 310 can also periodically take snapshots of the data on the memory cards 354A and copy such data back to the tape cartridge 316 (or another tape cartridge 316).

It is appreciated that the tape drive system 310 as described in detail herein can be sold alone or as part of a dual drive for use with any suitable servers, as well as part of an overall media library. Additionally, it is further appreciated that such tape drive system 310 enables the media library 220 to use multiple hybrid drives like this and thus create larger RAID arrays or object storage. For example, if the memory system 354 of the tape drive system 310 is used as a new way to provide automatic backup and snapshot of the data on the storage media 316, the data on the storage media 316 could be raw object storage from the tape drive system 310. This would make possible the ability to create an almost infinitely expandable object storage in the media library 220 that is automatically archived and backed up asynchronously and in parallel over many such hybrid drives. Thus, the object storage would be relieved from the housekeeping task of archiving and backup, since policies for the partition of the tape drive system 310 would automatically and independently be backing up each object drive in the tape drive system 310.

Figure 4:
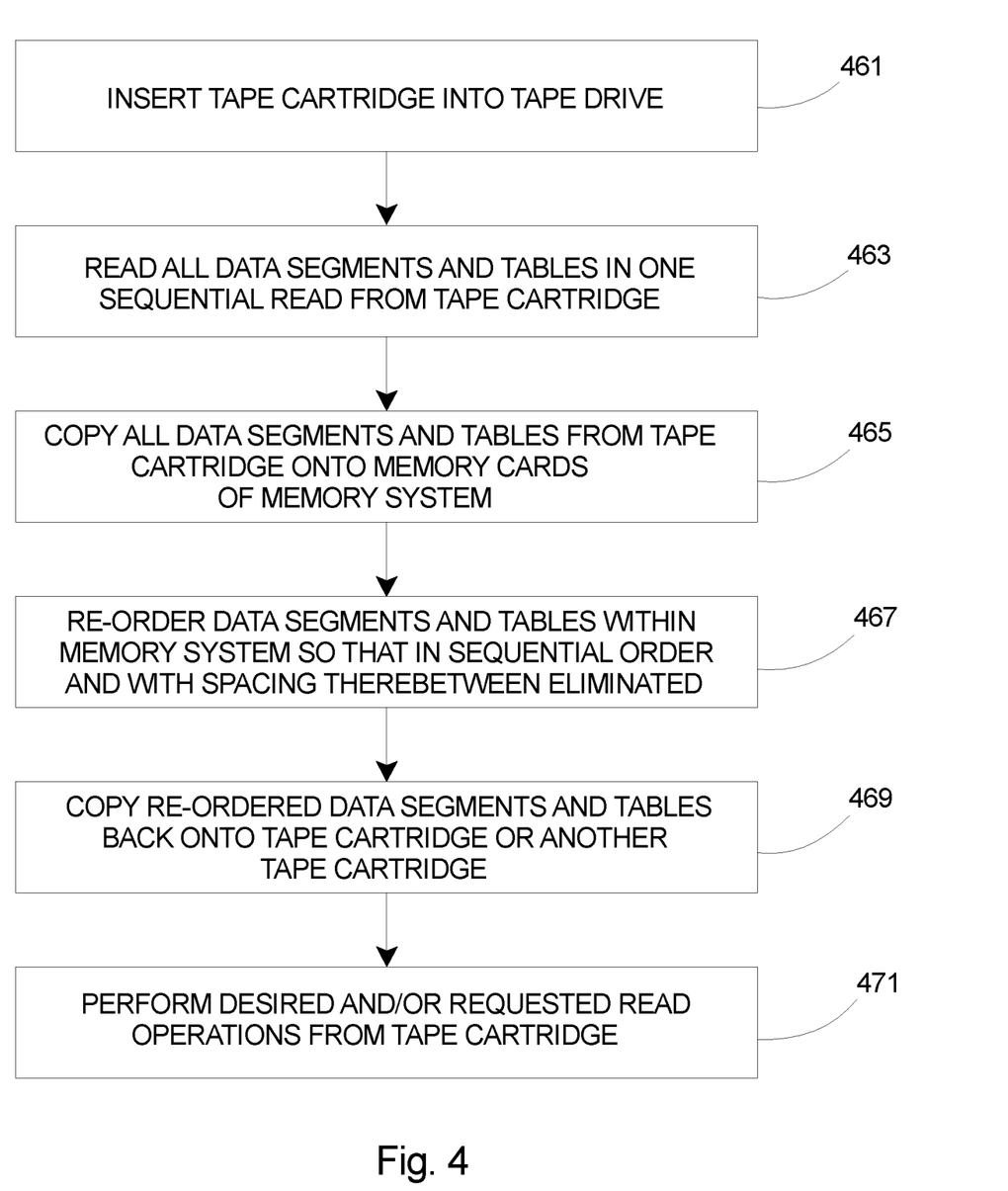
FIG. 4 is a flowchart illustrating one exemplary use of the media drive system.

FIG. 4 is a flowchart illustrating one exemplary use of the media drive system, e.g., a tape drive system. In particular, FIG. 4 illustrates a method for using the tape drive system to gain quick and easy access to the data segments and tables on a media cartridge, e.g., a tape cartridge or tape media, even when the blocks of data are not initially ordered sequentially, i.e. providing random access to the data segments and tables on the media cartridge.

As noted above, tape media can provide very fast read operations if the blocks of data are all ordered sequentially on the tape media. However, if the blocks of data are not ordered sequentially, tape positioning and movement over the tape heads typically slows down any read operations to an unacceptable slow rate. Additionally, any tape repositioning movement over the tape heads can lead to a shoe-shining effect, which requires the tape drives to be cleaned often and the tape media to wear quickly. The method recited herein provides the necessary steps to overcome such drawbacks due to the unique features and components, e.g., the controller, the processor and the memory system, that are included with the tape drive system of the present invention.

At step 461, the tape cartridge is inserted into the tape drive of the tape drive system. It is understood that the tape cartridge can be inserted into the tape drive with the use of a retrieval assembly of a media library, and/or the tape cartridge can be manually inserted into the tape drive.

At step 463, the tape drive system is used to read all of the data segments and tables in one sequential read from the tape cartridge. It is appreciated that it is not necessary to read all of the data segments and tables in one sequential read from the tape cartridge, but this provides the most time-efficient manner in which to read all of the data segments and tables from the tape cartridge. For example, one sequential read would reduce wear on the tape media and the tape drive head, as well as reducing the time required depending upon how many out of order data blocks are on the original tape media.

At step 465, the tape drive system is controlled by the controller and/or the processor to copy all of the data segments and tables from the tape cartridge onto at least one memory card that is included within the memory system.

At step 467, the controller and/or the processor are utilized to re-order the data segments and tables within the memory card(s) of the memory system so that the data segments and tables are now in sequential order. This further enables the removal or elimination of any unused or wasted space between the data segments and tables, such as may result due to old deleted data segments.

At step 469, the re-ordered data segments and tables are then copied back onto the tape media. For example, in certain applications, the re-ordered data segments and tables can be copied back onto the same tape cartridge on which the data segments and tables were originally contained. Alternatively, the re-ordered data segments and tables can be copied onto another tape cartridge. It is understood that data replication under such methodology would be extremely fast.

At step 471, the tape drive is controlled to perform the desired/requested read operations from the tape cartridge. It is appreciated that since the data segments and tables are now in sequential order on the tape cartridge, the desired/requested read operations can now be performed very quickly. Stated in another manner, any subsequent access by an application to the resulting tape media would be at the fastest possible data rate and the desired tasks could be completed in a minimal time frame. Further, such fast read operations have thus been accomplished solely with the use of the tape drive system of the present invention having enhanced and improved functionality, and without the need for multiple tape drives or external servers which would otherwise slow down the process and add undesired costs.

Figure 5:
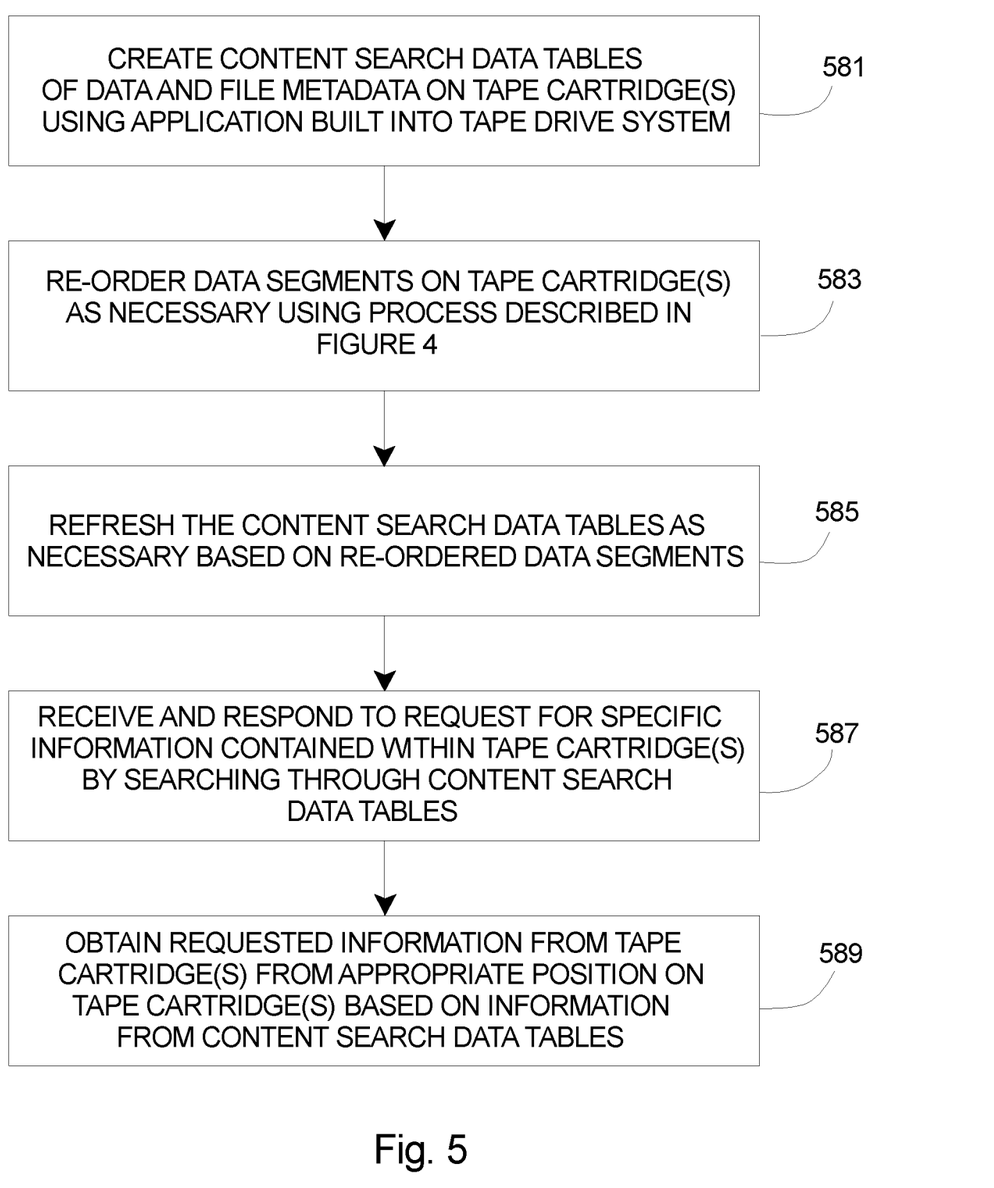
FIG. 5 is a flowchart illustrating another exemplary use of the media drive system.

FIG. 5 is a flowchart illustrating another exemplary use of the media drive system, e.g., the tape drive system. In particular, FIG. 5 illustrates a method for enabling a user to find desired information that is contained somewhere within one or more media cartridges, e.g., tape cartridges, within a media library. For example, in some applications, such a search may be required pursuant to a government search order, to obtain certain medical data that is saved and/or archived within a media library, to obtain information as part of a big data mining application, etc.

At step 581, an application that is built into the tape drive system is utilized to create content search (and/or addressable) data tables of data and file metadata that are contained on one or more tape cartridges. More particularly, the controller of the tape drive system can be configured to create the content search (and/or addressable) data tables. In certain embodiments, the content search data tables can be included in a special file at the beginning of the tape media. Alternatively, in other embodiments, the content search data tables can be sent to an external application for purposes of providing the desired content searching capabilities.

At step 583, data segments that are included on a tape cartridge are re-ordered as necessary using the process described in detail in relation to FIG. 4.

At step 585, the content search data tables are refreshed as necessary based on any re-ordering of the data segments that occurred at step 583.

At step 587, a user or operator of the media library receives a request to access certain information that is contained within one or more tape cartridges within the media library. The tape drive system responds to such request by using the created application to search through the content search data tables.

At step 589, the requested information is obtained from the appropriate position on the one or more tape cartridges based on the information that was learned during the search through the content search data tables in step 587. As such, using this method and application, desired information can be quickly and easily acquired from the tape cartridges through the use of the content search data tables. Thus, such an application would provide certain time-efficiency and cost-efficiency advantages (i.e. requiring relatively little time and effort) as opposed to such a search being performed on an ad hoc basis, which would require much resources and time and may also be somewhat error prone.

It is appreciated that the order of the steps illustrated and described in FIGS. 4 and 5 are not necessarily indicative of how the tape drive system operates chronologically, as one or more of the steps can be combined, reordered, and/or performed simultaneously without deviating from the intended breadth and scope of the tape drive system.

Additionally, it is understood that although a number of different embodiments of the tape drive system 210 have been illustrated and described herein, one or more features of any one embodiment can be combined with one or more features of one or more of the other embodiments, provided that such combination satisfies the intent of the present invention.

While a number of exemplary aspects and embodiments of the tape drive system 210 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A media drive system for use with a first media drive and a second media drive, each of the media drives being configured to perform read/write operations relative to a media cartridge, the media drive system being configured for use within a media library including (i) a library housing that defines an interior cavity, and (ii) a plurality of storage slots that are positioned within the interior cavity, each of the plurality of storage slots being configured to alternately retain the media cartridge, the plurality of storage slots being configured not to perform read/write operations relative to the media cartridge, the media drive system comprising:

a first housing body that is configured so that only the first media drive of the first and second media drives is retained therein or coupled thereto, the first media drive including a first drive housing that is positioned within the first housing body, none of the plurality of storage slots being positioned within the first housing body;

a first controller that is physically integrated with the first housing body, the first controller being configured to provide sole functional control of the first media drive, the first controller being unrelated to any functionality of all other components of the media library that are positioned within the interior cavity as defined by the library housing, but are not positioned within the first housing body;

a second housing body that is configured so that only the second media drive of the first and second media drives is retained therein or coupled thereto, none of the plurality of storage slots being positioned within the second housing body; and a second controller that is physically integrated with the second housing body, the second controller being configured to only control functionality of the second media drive.

2. The media drive system of claim 1 wherein the first controller includes a processor.

3. The media drive system of claim 2 wherein the processor includes an operating system.

4. The media drive system of claim 2 wherein the processor is configured to perform checksum operations to verify the accuracy of data contained within the media cartridge.

5. The media drive system of claim 1 wherein the first controller includes a memory system having at least one memory card.

6. The media drive system of claim 5 wherein the first controller is configured to (i) copy data from the media cartridge to the at least one memory card, (ii) reorder the data on the at least one memory card, and (iii) recopy the reordered data to one of the media cartridge and a second media cartridge.

7. The media drive system of claim 1 wherein the first controller is configured to generate a content search data table of data that is contained on the media cartridge.

8. The media drive system of claim 1 further comprising a plurality of electrical interfaces that are coupled to the first housing body, the plurality of electrical interfaces including at least two of a serial-attached SCSI type electrical connection, a fibre channel type electrical connection, an Ethernet-type electrical connection, and a USB-type electrical connection.

9. The media drive system of claim 1 wherein the first drive housing is configured to selectively receive a media cartridge, and the first media drive is configured to perform read/write operations relative to the media cartridge; and wherein the first controller is positioned spaced apart from the first drive housing.

10. A media library including (i) a library housing that defines an interior cavity; (ii) a plurality of storage slots that are positioned within the interior cavity, each of the plurality of storage slots being configured to selectively retain a media cartridge; (iii) the media drive system of claim 9 that is positioned within the interior cavity; and (iv) a storage media retrieval assembly that is positioned within the interior cavity, the storage media retrieval assembly being configured to selectively move the media cartridges between the plurality of storage slots and the media drive of the media drive system.

11. A method for reordering data from a media cartridge within a media drive system, the method comprising the steps of:
retaining a first media drive within a first housing body, the first media drive including a first drive housing that is positioned within the first housing body;
selectively positioning the media cartridge within the first drive housing;
physically integrating a first controller with the first housing body, the first controller being configured to control functionality of the first media drive, wherein the first controller is positioned spaced apart from the first media drive, the first controller having a memory system with at least one memory card;
copying data from the media cartridge to the at least one memory card of the memory system with the first controller;
reordering the data on the at least one memory card with the first controller; and recopying the reordered data from the at least one memory card to the media cartridge that is selectively positioned within the first drive housing; and
wherein the steps of copying, reordering and recopying are each performed using only the first media drive.

12. The method of claim 11 wherein the step of physically integrating the first controller includes the first controller having a processor.

13. The method of claim 12 further comprising the step of performing checksum operations with the processor to verify the accuracy of the data contained within the media cartridge.

14. The method of claim 11 further comprising the step of generating a content search data table of data that is contained on the media cartridge with the first controller.

15. The method of claim 11 further comprising the step of coupling a plurality of electrical interfaces to the first housing body, the plurality of electrical interfaces including at least two of a serial-attached SCSI type electrical connection, a fibre channel type electrical connection, an Ethernet-type electrical connection, and a USB-type electrical connection.

16. A media drive system that is configured for use within a media library including a library housing that defines an interior cavity and a control system that controls general functionality of the media library, the media drive system comprising:
a first media drive including a first drive housing that is configured to selectively receive a media cartridge, the first media drive being configured to perform read/write operations relative to the media cartridge;
a first housing body, the first drive housing being positioned within the first housing body; and
a first controller that is physically integrated with the first housing body, the first controller being configured to provide sole functional control of the first media drive, the first media drive being positioned within the first housing body; the first controller being positioned spaced apart from the first drive housing, the first controller being unrelated to any functionality of all other components of the media library that are positioned within the interior cavity as defined by the library housing, but are not positioned within the first housing body.

17. The media drive system of claim 16 further comprising a second media drive including a second drive housing that is configured to selectively receive the media cartridge, the second media drive being configured to perform read/write operations relative to the media cartridge; a second housing body; and a second controller that is physically integrated with the second housing body, the second controller being configured to provide sole functional control of the second media drive, the second media drive being positioned within the second housing body, the second controller being positioned spaced apart from the second drive housing, the second controller being unrelated to any functionality of components of the media library that are positioned within the interior cavity as defined by the library housing, but are not positioned within the second housing body.

18. The media drive system of claim 16 wherein the media library further includes (i) the library housing that defines the interior cavity, and (ii) a plurality of storage slots that are positioned within the interior cavity, each of the plurality of storage slots being configured to selectively retain the media cartridge, the plurality of storage slots not being configured to perform read/write operations relative to the media cartridge; and wherein none of the plurality of storage slots are positioned within the first housing body.

19. The method of claim 11 further comprising the steps of retaining a second media drive within a second housing body, the second media drive including a second drive housing that is positioned within the second housing body; and physically integrating a second controller with the second housing body, the second controller being configured to control functionality of the second media drive, wherein the second controller is positioned spaced apart from the second drive housing.

20. The method of claim 11 wherein the step of physically integrating the first controller includes the first media drive being configured to perform read/write operations relative to the media cartridge; wherein the media drive system is configured for use within a media library including (i) a library housing that defines an interior cavity, and (ii) a plurality of storage slots that are positioned within the interior cavity, each of the plurality of storage slots being configured to selectively retain the media cartridge, the plurality of storage slots not being configured to perform read/write operations relative to the media cartridge; and wherein none of the plurality of storage slots are positioned within the first housing body.

* * * * *